US 8,602,170 B2
Dec. 10, 2013

(12) United States Patent
Fischer

(54) MULTIPLE BRAKE DEVICE FOR ELEVATOR WITH MONITORING

(75) Inventor: Daniel Fischer, Villarsel-sur-Marly (CH)

(73) Assignee: Inventio AG, Hergiswil (CH)

( * ) Notice: Subject to any disclaimer, the term of this patent is extended or adjusted under 35 U.S.C. 154(b) by 301 days.

(21) Appl. No.: 12/742,755

(22) PCT Filed: Nov. 6, 2008

(86) PCT No.: PCT/EP2008/065066
§ 371 (c)(1),
(2), (4) Date: May 13, 2010

(87) PCT Pub. No.: WO2009/062881
PCT Pub. Date: May 22, 2009

(65) Prior Publication Data
US 2010/0252368 A1    Oct. 7, 2010

(30) Foreign Application Priority Data

Nov. 14, 2007  (EP) .................................. 07120652
Mar. 7, 2008   (EP) .................................. 08102368

(51) Int. Cl.
*B66B 1/32* (2006.01)
(52) U.S. Cl.
USPC .......................................... 187/288; 187/391
(58) Field of Classification Search
USPC ......... 187/258, 288, 359, 362, 367, 368, 369, 187/371, 373, 391–393; 318/362, 363, 369, 318/371, 372
See application file for complete search history.

(56) References Cited

U.S. PATENT DOCUMENTS

| | | | | |
|---|---|---|---|---|
| 4,923,055 A * | 5/1990 | Holland | ........................ | 187/287 |
| 5,323,878 A * | 6/1994 | Nakamura et al. | ............ | 187/264 |
| 6,578,672 B1 * | 6/2003 | Miyoshi | ........................ | 187/254 |
| 7,527,127 B2 * | 5/2009 | Osterman et al. | ............. | 187/391 |
| 7,730,998 B2 * | 6/2010 | Takahashi et al. | ............ | 187/288 |
| 7,866,633 B2 * | 1/2011 | Weiss et al. | ................... | 254/378 |
| 7,896,138 B2 * | 3/2011 | Syrman et al. | ................ | 187/391 |
| 7,931,127 B2 * | 4/2011 | Kondo et al. | ................. | 187/288 |
| 8,113,318 B2 * | 2/2012 | Monzon et al. | ............... | 187/288 |
| 8,167,094 B2 * | 5/2012 | Ueda et al. | .................... | 187/288 |
| 8,205,721 B2 * | 6/2012 | Korhonen et al. | ............ | 187/288 |
| 2007/0007083 A1 | 1/2007 | Husmann | | |
| 2007/0056804 A1 | 3/2007 | Thielow | | |

FOREIGN PATENT DOCUMENTS

| | | |
|---|---|---|
| CA | 2590930 A1 | 12/2007 |
| CN | 1886324 A | 12/2006 |
| DE | 19737485 C1 | 6/1999 |
| EP | 1655506 A2 | 5/2006 |

(Continued)

*Primary Examiner* — Anthony Salata
(74) *Attorney, Agent, or Firm* — Fraser Clemens Martin & Miller LLC; William J. Clemens

(57) ABSTRACT

An elevator drive for driving and holding an elevator car includes a traction wheel providing a driving and a holding force to the elevator car, a motor driving the traction wheel, a braking arrangement for holding the traction wheel, and a drive shaft connecting the traction wheel, the motor and the braking arrangement together. The braking arrangement includes at least two braking devices arranged, on opposite sides of the traction wheel on the drive shaft. A monitoring logic system ascertains whether an activated one of the braking devices alone can maintain the elevator car at standstill during a brief time the other of the one of the braking devices is released for issuing fault information to an elevator control.

23 Claims, 9 Drawing Sheets

(56) References Cited

FOREIGN PATENT DOCUMENTS

| | | | |
|---|---|---|---|
| EP | 1671912 | A1 | 6/2006 |
| GB | 1377917 | A | 12/1974 |
| GB | 1488374 | A | 10/1977 |
| WO | 9832684 | A1 | 7/1998 |
| WO | 0119715 | A1 | 3/2001 |
| WO | 2005/032993 | A2 | 4/2005 |
| WO | 2007020325 | A2 | 2/2007 |

* cited by examiner

MONITORING LOGIC SYSTEM

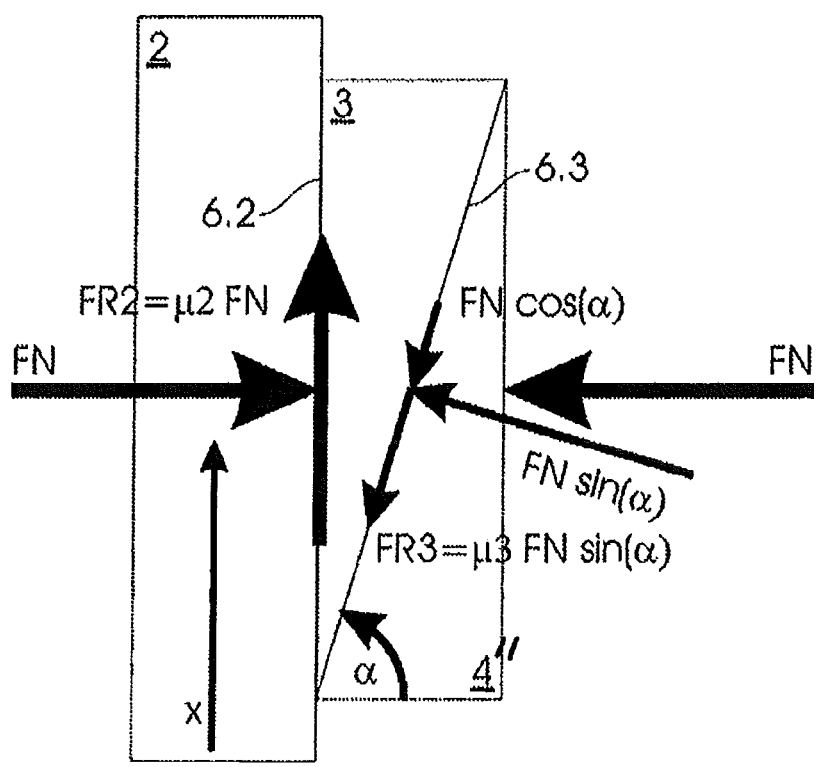

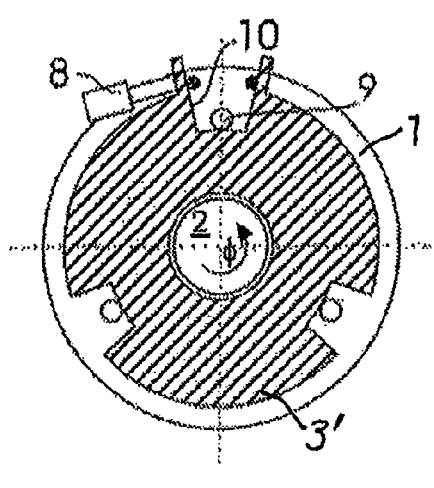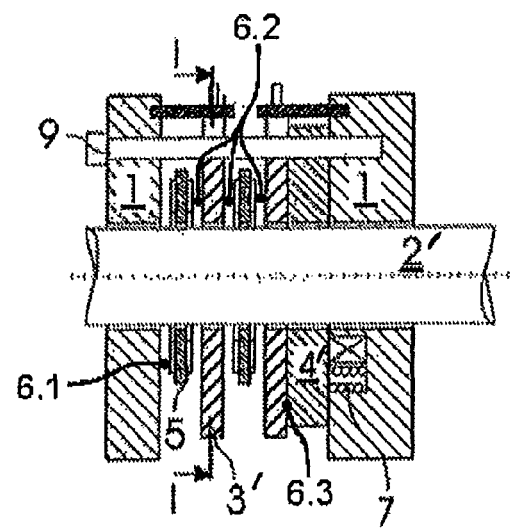

US 8,602,170 B2

MULTIPLE BRAKE DEVICE FOR ELEVATOR WITH MONITORING

FIELD OF THE INVENTION

The present invention relates to an elevator drive for driving and holding an elevator car, as well as a brake device, a corresponding method and an elevator installation.

BACKGROUND OF THE INVENTION

An electromagnetically actuable brake device, such as can be used in an elevator drive, with a stationary housing and a drive shaft rotatable therein is known from DE 197 37 485 C1. Two brake discs are connected with the drive shaft to be secure against rotation relative thereto, but are axially displaceable. Axially displaceable armature discs are each biased, through a respective spring, by a normal force against the brake discs in such a manner that a first frictional contact between the brake discs and the housing and a second frictional contact between the armature discs, which are secure against rotation relative to the housing, and the brake disc are formed. The frictional forces acting in these contacts oppose a rotation between the brake disc, which is rotationally fixed to the drive shaft, and the housing or the armature disc, which is rotationally fixedly connected therewith, and thus brake the drive shaft. In order to release the brake the armature discs are electromagnetically released against the springs. The armature discs are of three-part construction so as to reduce noise arising when the brake is applied.

If such a brake device can exert only a reduced friction force between armature discs and brake discs due to wear in the brake discs it is possible for slipping of the armature discs on the brake part discs bearing thereagainst to arise. This jeopardises safety.

SUMMARY OF THE INVENTION

It is therefore an object of the present invention to provide an elevator drive with a brake device which increases the safety of the elevator drive.

A brake device is usually installed in an elevator drive. The drive serves for driving and holding an elevator car and it substantially comprises a traction wheel or a drive pulley for transmitting a driving and/or holding force to the elevator car, a motor for driving the traction wheel and a brake arrangement for holding the traction wheel. A drive shaft connects the traction wheel, motor and brake arrangement together. The brake arrangement comprises at least two brake devices, wherein, according to one aspect of the invention, the traction wheel is arranged between the brake devices. This is advantageous, since the braking moments which have to be transmitted by the traction wheel to the brake devices are split up. In an advantageous symmetrical division of the brake devices, namely half on each side of the traction wheel, a moment, which is to be transmitted, in the drive shaft is reduced to half. A risk of failure or risk of fracture of the drive shaft is thereby significantly reduced. In addition, if failure of the drive shaft should occur a braking function is still maintained, since the brake devices are distributed to either side of the traction wheel. The terms "traction wheel" and "drive pulley" have the same meaning with respect to the present invention.

Advantageously, the brake devices are arranged substantially at the two ends of the drive shaft. Easy access for maintenance and installation is thereby provided.

Advantageously, the brake devices arranged on either side of the traction wheel are individually controllable. Thus, when required a monitoring logic system can selectively ascertain whether one brake device alone is in a position of keeping the elevator car at standstill. This is advantageously carried out in that the activation of the brake devices for application thereof takes place with a small delay in time or that, alternatively, during a stop of the elevator car and if advantageously at the same time there is no reported need for transport, one brake device is temporarily released. The monitoring logic system can ascertain, during the time period when only one of the brake devices is applied, whether the one brake device alone is in a position of keeping the elevator car at standstill. This is additionally advantageous, since the overall function of the brake arrangement can thereby be checked.

The elevator drive according to the invention is usually arranged in stationary position in a travel shaft and drives the elevator car by way of support means. The support means are in this connection wound up on or unwound from the elevator drive or the traction wheel or frictionally driven by the traction wheel or the drive pulley. When friction is used a counterweight, which guarantees a sufficient counter-force, is usually fastened to the end of the support means opposite to the elevator car. In that case obviously the elevator car and correspondingly the counterweight can be directly suspended or they can be multiply suspended by means of a block-and-tackle arrangement.

However, the elevator drive can also co-travel, thus be arranged directly at the elevator car, wherein then the traction wheel acts on a stationary part, such as a rail with friction surface, a rack or spindle or, for example, a cable.

Advantageously, the brake device or at least one of the brake devices comprises an elevator drive of that kind, further in general a static element and a movable element or the drive shaft, which is movable relative to the static element in a first degree of freedom and is to be braked relative to the static element.

The term "braking" can in that case equally embrace braking of the element movable relative to the static element, thus reduction of the relative speed thereof, and also complete stopping or holding of the movable element. The distinction between static element and movable element serves in the present instance only for differentiation of two elements movable relative to one another in a degree of freedom. In particular, for example, one of the static element and movable element can be arranged to be inertially fixed in order to brake the other one of the static element and movable element relative to the surroundings. The brake device can in that case be constructed as, in particular, a parking brake for holding the car.

This is the normal case with current elevator installations, since the elevator car or the drive parts, such as drive, counterweight and support means, connected with the car are decelerated to standstill in regulated manner by electromotive force and the brake device consequently only has to hold the already stationary car. However, a brake device of that kind obviously has to take over, apart from the parking function, also a braking function if, for example, in the event of a fault such as, for example, interruption of power rapid stopping of the elevator car has to be carried out.

The first degree of freedom can be, for example, a degree of freedom in rotation. For this purpose the movable element can be rotatably mounted in the static element. In this sense the term "force" embraces generally the forces or torques, which act in the respective degree of freedom, in order to together represent the present invention, the invention being able to be used in different brake devices acting in different degrees of freedom. If therefore, "friction force" is mentioned this embraces, in the case of degrees of freedom in rotation, also the effective friction torque.

The first degree of freedom can also be a degree of freedom in translation. For this purpose the movable element can be displaceably mounted in the static element, such as is known from, for example, DE 41 06 595 A1, in which a static element in the form of a measuring brake linearly slides along a movable element in the form of a brake engagement rail.

A first frictional contact in a first contact surface can be selectably formed between the static element and the movable element by a controllable normal force, which acts in a second degree of freedom. In the first frictional contact a first friction force opposes movement of the movable element relative to the static element. In DE 197 37 485 C1 for this purpose the brake discs are, for example, pressed against the housing in a first contact surface. The first friction forces arising in these frictional contacts oppose rotation of the drive shaft, which is connected with the brake discs to be secure against rotation relative thereto. As explained in the foregoing, the term "friction force" in that case embraces, having regard to the degree of freedom of the drive shaft in rotation, the friction torque acting thereon.

In addition, one or more relative elements are provided in such a manner that a second frictional contact in a second contact surface is formed between the movable element and each of the relative elements by the normal force and in the second frictional contact a second friction force opposes movement of the movable element relative to the relative element. In DE 197 37 485 C1, for example, a first part disc of each three-part armature disc presses against the associated brake disc when the normal force urges the brake disc against the housing. The second friction forces arising in these frictional contacts oppose rotation of the drive shaft, which is connected with the brake discs to be secure against rotation relative thereto, relative to the first part discs, which are connected with the housing to be secure against rotation relative thereto.

Moreover, an actuating element fixed in the first degree of freedom relative to the static element is preferably associated with each relative element, wherein a third frictional contact in a third contact surface is formed between the actuating element and the relative element by the normal force and in the third frictional contact a third friction force opposes movement of the relative element relative to the actuating element. In DE 197 37 485 C1, for example, a second part disc of the three-art armature disc presses on the first part disc when the normal force urges the brake disc against the housing. The third friction forces arising in these friction contacts oppose rotation of the first part discs relative to the second part discs. The first, second and/or third contact surface is or are preferably loaded by the same normal force.

In a frictional contact an equal friction force FR, which can adopt the maximum value $FRmax=\mu \times FN$, opposing the sum of the remaining forces normally always arises, wherein FN denotes the normal force acting on the contact surface and $\mu$ denotes a coefficient of friction. If in that case static friction (Index H) is present a friction force $FR^H=\mu^H \times FN$ can thus maximally arise. If the sum of the remaining acting forces exceeds this value then the frictional contact changes from static friction to sliding friction (index G) and the coefficient of friction $FR^G=\mu^G \times FN$ arises. The term "sliding friction" in that case also embraces rolling friction such as occurs, for example, during rolling of roller bearings.

According to one variant of embodiment of the elevator drive according to the invention a relative element of the brake device is now movable in the first degree of freedom relative to the static element between a normal position and a braking position and is resiliently biased into the normal position, wherein the second and third contact surfaces are so constructed that a maximum second friction force, particularly in the case of sticking in the second and third frictional contact, is greater than a maximum third friction force. Movement of the relative element in the first degree of freedom out of the braking position is prevented, for example by a mechanically positive and/or frictional couple. For this purpose abutments can preferably limit movement of the relative element between normal position and braking position.

This has the following mechanical consequence: If the movable element is held, the normal force FN acts in the second degree of freedom, all three frictional contacts are formed and static friction prevails. Since the third friction force $FR3^H$ acting between the relative element and the actuating element, which is fixed in the first degree of freedom relative to the static element, is always smaller than the second friction force $FR2max^H$ which can maximally act between the relative element and the movable element, this smaller third friction force $FR3^H$ limits that friction force which is transmitted between the static element and the movable element by way of the actuating element and the relative element. Together with the first friction force $FR1^H$, which can be transmitted directly to the first contact surface, i.e. without interposition of the actuating element and relative element, the entire friction force $FR^H$ acting on the movable element thus appears as the sum of these two friction forces:

$$FR^H=FR1^H+FR3^H \qquad (1)$$

If, in operation, this friction force is now no longer sufficient to hold the movable element, which can result particularly from wear or contamination leading to a diminishing normal force and/or a reduced coefficient of friction in the contact surfaces, slipping of the movable element relative to the static element in the first degree of freedom occurs.

In this case the movable element moves in the first degree of freedom even in the presence of normal force FN. Since the maximum second friction force between relative element and movable element is, in accordance with the invention, greater than the maximum third friction force between relative element and actuating element, static friction is again present in the second frictional contact, whereas the third frictional contact transfers to sliding (or rolling). In that case the movable element entrains the relative element in the first degree of freedom until it goes out of its normal position and into the braking position and is stopped there, for example in mechanically positive manner, by an abutment or the like. The relative element is consequently switched automatically, i.e. without external control influence, from the normal position to the braking position and this change takes place in both travel directions, thus rearwards and forwards.

As soon as the relative element is stopped in the braking position and fixed in the first degree of freedom relative to the static element, the second friction force FR2 is transmitted from the static element to the movable element by way of the second contact surface between relative element and movable element. The entire friction force FR acting on the movable element thus arises as the sum of these two friction forces:

$$FR=FR1+FR2 \qquad (1')$$

$$>FR1+FR3 \qquad (1'')$$

If in a brake device according to the present invention the entire friction force FR=FR1+FR3 designed for holding the movable element in the normal case is then no longer sufficient for holding the movable element, this thus moves in the first degree of freedom and in that case shifts, as described in the foregoing, the relative element into its braking position, where it is fixed relative to the static element and transmits the second, greater friction force FR2 to the movable element, so that the entire friction force of FR1+FR3 acting thereon increases to FR1+FR2. Advantageously, a safety margin S=(FR1+FR2)/(FR1+FR3) can thereby be made available for the case that the normal total friction force is no longer sufficient, for example because the first and/or third contact surface has or have wear or oil contamination or the normal force diminishes.

This shifted build-up of the total force required for braking has a further favourable effect insofar as a force pulse on the entire moved system is reduced, due to the fact that the braking force is built up by way of two stages.

Alternatively, instead of the third contact surface and the actuating element use can also be made of, for example, a pressing spring which on the one hand can produce urging of the relative element in the second degree of freedom and on the other hand enables relative displacement of the relative element in the first degree of freedom between normal position and braking position. In this embodiment the relative element can, for example, be constructed at the same time as an armature plate. In this form of embodiment the value of the friction force of the third contact surface (FR3) reduces virtually to zero. If in the following embodiments the third contact surface is always used, it is also to be understood with respect thereto that this third contact surface can, as described, be eliminated and the associated friction force (FR3) adopt the value zero.

It can be difficult to simply and reliably detect a faulty function in a brake device. Such a faulty function can be present, for example, if the brake device during travel operation does not release or if, as described in the foregoing, it exerts only a reduced braking force. For this purpose, for example, it is known to manually carry out, within operation, a check of braking force and wear at maintenance intervals, which is costly in terms of time and personnel as well as susceptible to error.

In a preferred embodiment of the present invention the brake device therefore comprises a sensor device for detecting the normal and/or braking position of the relative element. Such a sensor device can be, for example, a contact which is closed when the relative element comes into braking position and/or is opened as soon as the relative element leaves the normal position. Equally, for example, optical sensors can monitor the position of the relative element or position transmitters detect the position of the relative element.

If, as described in the foregoing, the movable element moves, even when subject to normal force FN, in the first degree of freedom the movable element entrains the relative element in the first degree of freedom until it passes from its normal position into the braking position.

This movement of the relative element is recognized by the sensor device for detecting the normal and/or braking position. Since the relative element is biased into the normal position and remains therein when the total friction force $FR^H=FR1^H+FR3^H$ is sufficient for holding, thus in the case of normal, fault-free operation, it is possible to reliably conclude—from a shift of the relative element from the normal position to the braking position—faulty functioning of the brake device and the corresponding elevator drive and, for example, to issue a warning to an elevator control.

An advantage of the invention arises through the use of an expedient monitoring logic system which monitors correct functioning of the brake device. This monitoring logic system comprises the sensor device for detecting the normal and/or braking position of the relative element, a speed and/or travel measuring device and the control signal for the brake device. On occasion, the brake device can also be provided with a further sensor for ascertaining the state "contact play removed" or "brake applied" or "contact play present" or "brake released". In the following a "control signal brake" signals the command state which a control device gives to the brake device as control signal ("apply" or "release"). The "speed" corresponds with the state of the movable element or the travel body or elevator car and indicates whether the movable element is disposed at standstill (0) or in motion (≠0).

A diagnosis of the state can then follow, for example, the following diagram:

|  | Control signal brake |  | Speed |  | Position of relative element |  | Determination |
| --- | --- | --- | --- | --- | --- | --- | --- |
|  | Apply | Release | 0 | ≠0 | Normal | Braking |  |
| F1 | X |  | X |  | X |  | In order |
| F2 | X |  | X |  |  | X | Brake fault/Overload |
| F3 | X |  |  | X | X |  | In order |
| F4 |  | X |  | X | X |  | In order |
| F5 |  | X |  | X |  | X | Release fault |

This diagnostic diagram allows an almost constant monitoring of the function of the brake device, particularly since at each stop (F1, F2) the desired state can be detected and in the event of deviation appropriate measures can be undertaken. No risk exists, since on reaching the braking position an increased braking force, usually a braking force increased by approximately the factor 2, is available. Secure holding is thus guaranteed.

Equally, on determination of a release fault (F5) the installation can be stopped and the function verified. On the basis of a fault history, which is stored in the monitoring logic system, servicing can be performed in targeted manner.

A free-running travel of the relative element can in that case be kept small. It can be selected to be merely of such size that reliable determination of the position of the relative element by the sensor device is made possible in simple manner and, on the other hand, no risky deviation in holding such as, for example, formation of a step in the case of an elevator car arises due to the resulting displacement of the movable element or of the travel body. The selected free-running travel is typically approximately 3 to 10 millimeters in each of two directions of movement in correspondence with the first degree of freedom.

The relative element is kept in its normal position, or returned again to the normal position after relative displacement has taken place, by means of a bias. This bias can be produced by means of, for example, a resilient spring, for example a simple torsion bar, a mechanical torsion spring or helical spring, or also a hydraulic spring. Biasing by means of magnetic force is also possible, in that magnetic poles are appropriately arranged. In the case of use, in particular, of a pressing spring instead of the actuating element as explained in the foregoing, the biasing device can be combined with a magnetic release unit.

In the foregoing the bias, which is to be overcome by the relative element on movement from the normal position to the braking position and which seeks to bias the relative element into or restore it to the normal position, was disregarded. Advantageously, however, the second and third contact surfaces are so constructed that the maximum second friction force, particularly in the case of adhesion in the second and third frictional contact, is also greater than the sum of the maximum third friction force and the force KV biasing the relative element into its normal position:

$$FR2\max^H > FR3\max^H + KV \quad (2)$$

which in the case of a negligibly small force KV for $$FR2\max^H > FR3\max^H \quad (2')$$

is fulfilled, particularly if the second friction force is substantially greater than the third friction force:

$$FR2\max^H >> FR3\max^H \quad (2'').$$

Since, in addition, relatively large friction forces $FR2^H$, $FR3^H$ regularly arise in brake devices, particularly for elevator installations, Equation (2) is also applicable in good approximation with Equation (2') or (2'').

In the foregoing there was explanation of the case of holding the movable element, in which static friction prevailed in each of the first, second and third frictional contact. If the brake device is provided as a parking brake for holding, only this case arises.

If, however, the brake device is additionally employed for braking the movable element, then the movable element further moves in the first degree of freedom during braking even when subjected to the normal force and in that case by reason of the afore-described principle seeks to entrain the relative element and draw it from its normal position to its braking position. In this case sliding friction is present in the first and at least in the second or third frictional contact.

For this case the force KV biasing the relative element into the normal position can be so designed that in the course of a normal braking procedure it sufficiently compensates, together with the third friction force, for the second friction force and thus holds the relative element in its normal position. The biasing can in general be produced by means of, for example, a resilient spring, for example a mechanical torsion or helical spring or a hydraulic spring. When the movable element is finally braked to a standstill and subsequently held, then the contact states in the first, second and third frictional contact, respectively, change from sliding friction to static friction. The thus-arising static friction forces are in general significantly higher than the friction forces, which prevail during braking, in sliding friction (or rolling friction).

If the total static friction force $FR^H = FR1^H + FR3^H$ is no longer sufficient for holding the movable element, the relative element, as described in the foregoing, ultimately shifts into its braking position and is fixed there, which in the preferred embodiment is detected by the sensor device. Since the sliding friction is in general significantly lower than the static friction, the relative element can during braking, in which sliding friction occurs in at least some of the contact surfaces, be held in its normal position by a small bias, whereas in the case of holding, in which static friction and thus a higher second and third friction force are present, the above-described mechanism for ensuring a sufficient total friction force or for detection of an erroneously low total static friction force $FR^H = FR1^H + FR3^H$ comes into being.

In a preferred embodiment the second and third contact surfaces are therefore constructed in such a manner that the second friction force $FR2^G$, which arises in the second frictional contact during sliding, is less than the sum of the force KV, which biases the relative element into its normal position, and the third friction force $FR3^G$ and/or $FR3^H$, which arises or arise in the third frictional contact during sliding or adhesion. The relative element is thereby held in its normal position during braking. At the same time, in this preferred embodiment the second and third contact surfaces are constructed in such a manner that the maximum second friction force $FR2\max^H$, which can maximally arise in the second frictional contact in the case of adhesion, is greater than the sum of the force KV, which biases the relative element into its normal position, and the third friction force $FR3\max^H$, which can arise in the third frictional contact in the case of adhesion. As explained in the foregoing, this is simple to realize, since the static friction forces are in general significantly higher than the sliding friction forces. Thus, in the preferred embodiment:

$$FR2^G < KV + FR3^G \quad (3)$$

$$FR2\max^H > KV + FR3\max^H \quad (2)$$

However, fulfilment of the condition (2) is as a rule already sufficient for the following reason: When the brake device begins the braking process, the first, second and third frictional contacts are formed. In that case, sliding friction is immediately present in the second frictional contact between the movable element, which initially moves relative to the static element, and the relative element, which is biased into its normal position of being stationary relative to the static element. Static friction is initially present in the third frictional contact between the relative element and the actuating element as long as the relative element is not accelerated. Now, as mentioned in the foregoing, the sliding friction is in general significantly lower than the maximum static friction. The second frictional force $FR2^G$ acting in the second frictional contact is thus in general lower than the third friction force $FR3\max^H$ which can maximally arise in the third friction contact. Thus, in the usual case (insofar as relative element and actuating element do not move relative to one another) the second friction force in the second frictional contact, in which sliding friction prevails, is significantly smaller during braking than the third friction force in the third frictional contact, in which static friction prevails. The relative element is thus held in its normal position until the movable element has completely come to a stop. Thus, at the start of braking $$FR2^G < FR3\max^H + KV \quad (3')$$

so that the relative element does not move relative to the actuating element, but remains in its normal position, whilst sliding friction is present in the second frictional contact. As soon as the movable element is stationary, the second frictional contact also changes from sliding friction to static friction and $$FR2\max^H > KV + FR3\max^H \quad (2)$$

If the remaining forces acting on the movable element now exceed the maximum friction forces provided by the brake device $$FR\max^H = FR1\max^H + FR3\max^H \quad (1'''),$$

the relative element is shifted from its normal position into the braking position and fixed there, wherein advantageously a faulty function can be recognized. As explained, the fulfilment of the condition (2) or, with disregard of the force KV, the condition (2') is sufficient to increase the safety of the brake device and to detect a faulty function in the case of a brake device which only holds. If the movable element is also braked by the brake device, fulfilment of the condition (3) or (3') is also sufficient in order to ensure that the relative element remains in its normal position during the normal braking process, so that subsequently the afore-described safety margin is available and advantageously a faulty function in the case of holding can be ascertained.

Condition (3') is as a rule fulfilled simultaneously with condition (2) or (2'), since the sliding friction (or rolling friction) is usually significantly lower than the static friction. Thus, in accordance with the invention it is generally only required for the maximum friction force FR2max, which is present in the second frictional contact and is usually defined by the maximum static friction force FR2max$^H$, to be larger than the maximum friction force FR3max, which is present in the third frictional contact and is usually defined by the maximum static friction force FR3max$^H$ (condition (2')). Thus, in general condition (3') is also fulfilled, so that, even in the case of braking, the relative element is kept in its normal position until the held state is attained.

Advantageously, however, this fine-turning of the bias is dispensed with when the brake device is employed primarily as a holding or parking brake and used for dynamic braking of the travel body only in the case of need. A case of need is, for example, response of a speed monitoring circuit or a power failure, etc. In such a case of need it is then certainly desired for the relative element to be entrained without delay into the braking position (B) and then necessarily produce a higher braking force. The requirement for the bias is then correspondingly low and it is merely designed in order to move the unloaded relative element (3) back into the normal position and releasably keep it there with low force.

The maximum second friction force can, for example, be predetermined to be greater than the maximum third friction force in that the second contact surface has a higher coefficient of friction than the third contact surface. The conditions (2) or (2') and (3) or (3') can thus be fulfilled. If relative element and actuating element are subjected to the same normal force FN, then a maximum second friction force FR2=µ2×FN greater than the maximum third friction force FR3=µ3×FN thus arises. For that purpose the second and third contact surfaces can, for example, consist of different material. Accordingly, the relative element can have on the second contact surface a coating for increasing the coefficient of friction µ2 and/or the actuating element can have on the third contact surface a coating for reducing the coefficient of friction µ3. Roller bearings, particularly needle bearings, for representation of specific coefficients of friction can also be arranged in the third contact surface.

In a preferred embodiment the coefficients of friction of the first and second contact surfaces are substantially the same, so that substantially the same friction forces arise in the first and second frictional contacts, which can advantageously distribute the loads more evenly. The term "coefficient of friction" can in the present case embrace not only the coefficient of static friction, but also the coefficient of sliding or rolling friction of a frictional contact, wherein in practical application the first and second frictional contacts are executed in proven mode and manner as a brake friction lining.

The maximum second friction force can alternatively or additionally be predetermined to be greater than the maximum third friction force in that the third contact surface is inclined relative to the normal force. A correspondingly lower normal force thus acts on the inclined third contact surface and consequently a correspondingly lower third friction force. Advantageously, the normal force acting in the first, second and third frictional contact divides, in the case of an inclined third contact surface, into a component which is normal to the third contact surface and induces the third friction force and a component which is tangential to the third contact surface and adds to the third friction fore when there is movement in a direction in the first degree of freedom, or subtracts therefrom when there is opposite movement, to form a third total friction force. Thus, in the case of opposite movements in the first degree of freedom different third total friction forces could be represented. Advantageously, in the case of use of the inclined third contact surface a change in the normal force arises when there is relative movement between relative element and actuating element, since, for example, springs employed for producing this normal force are stressed or relaxed. This is advantageously employed in the case of use in, for example, elevator installations with partly balanced counterweights, since different braking actions can thus be produced depending on a possible direction of slip.

As mentioned in the foregoing translational forces and torques acting in the respective degree of freedom are to be understood by the term "force" in the present invention. Different friction forces can therefore also be represented by different lever arms. Thus, for example, a greater second friction force (in this case a torque) can be represented in that the second frictional contact is radially spaced further from an axis of rotation of the movable element than the third frictional contact. In the case of equal normal force, different friction forces—in this case torques—thus result.

The relative element and the actuating element can preferably be so moved by the normal force in the second degree of freedom that the first, second and third frictional contacts are formed. This makes possible a simple mechanical realization of the frictional contacts. In particular, a brake element can be provided which is fixed in the first degree of freedom relative to the movable element and is so moved by the normal force in the second degree of freedom that the first, second and third frictional contacts are formed. Equally, the movable element can be so moved relative to the static element by the normal force in the second degree of freedom, in particular resiliently deformed that the first, second and third frictional contact is formed.

The actuating element can, in a manner known by way of example from DE 197 37 485 C1 or DE 41 06 595 A1, be biased, particularly by resilient means, by the normal force and selectably released electromagnetically and/or hydraulically. In the event of failure of a voltage applied to an electromagnet, a pressure decay in a hydraulic line or a fault in the control of the brake device the actuating element is no longer released, so that the normal force forms the frictional contact and thus applies the brake device. In the case of a defect the brake device thus applies independently and automatically.

The elevator drive according to the invention accordingly comprises a brake device which is constructed in such a manner that the brake device when the travel body or movable element is stationary can be switched to a normal position in which the brake device generates a first holding force. This holding force is designed to keep the movable element at standstill. Moreover, in the case of a possible movement of the movable element and regardless of the direction of movement the brake device automatically changes from the normal position to a braking position. In the braking position the brake device produces a substantially doubled or multiplied holding force or braking force.

Advantageously, this automatic change from the normal position to the braking position is monitored by means of a sensor device. The advantage of this part of the invention is that a first slipping of the movable element can be recognized by means of the sensor device and that an automatic amplification of the holding force results, whereby further slipping is prevented.

Advantageously, the elevator drive is used in an elevator which accelerates the travel body on each occasion in regulated manner from standstill, for example by electric motor or hydraulically, and decelerates again to standstill, whereby the brake device is in the normal case employed only for holding the travel body at standstill.

An elevator drive according to the invention with a brake device can comprise a plurality of relative elements as well as actuating elements respectively associated therewith, as is basically known from, for example, DE 197 37 485 C1. The total friction forces explained in the foregoing then result from the sum of the first and third or second friction forces.

As explained in the foregoing, one of the possible faulty functions of a brake device can consist in an entire friction force, which is composed of the first and third friction force, being too small in order to hold the movable element at standstill. This faulty function can be recognized if the sensor device detects that the relative element is no longer disposed in its normal position. In that case a movement of the relative element is preferably limited by abutments. As a result, when these abutments are reached the second friction force, which is higher by comparison with the third friction force, comes into play and holds the movable element. This faulty function can thus be recognized without the function of holding the movable element being jeopardized overall. It is merely an indication that the safety margin S has been enlisted. The safety of the brake device is thus increased and servicing can be initiated.

A further possibly faulty function consists in that the brake device erroneously fails to release, i.e. the first, second and third friction contacts remain in place during travel operation. This faulty function can result from, for example, a defect in brake control units. This faulty function can also be recognized if the sensor device detects that the relative element is not disposed in its normal position, because, as described in the foregoing, in such a case the movable element entrains the relative element in the first degree of freedom, whereby this is shifted from its normal position to its braking position. A travel operation can be stopped, for example in the case of occurrence of a faulty function of that kind, before the corresponding contact surfaces overheat or have worn or suffered other damage.

In this connection it is particularly advantageous if a functional capability of the brake device and a sufficient safety margin for every normal operating play of the brake device can be ascertained. This significantly increases the operational safety of the brake device.

As a rule a brake device of that kind is delivered with new installations, advantageously directly together with a corresponding drive unit. Equally, a corresponding brake device can also be used in existing plants and elevator installations as a replacement for an existing brake device. Increased safety can thereby be achieved particularly in conjunction with a possible modernisation of a drive regulation system. An appropriate modernization kit adapted to known elevator installations can be provided.

DESCRIPTION OF THE DRAWINGS

Further objects, features and advantages of the present invention are evident from the subclaims and the following described exemplifying embodiments, for which purpose in partial schematic illustration:

FIG. 7 shows a schematic diagram of a third embodiment of the present invention;

FIGS. 8a, 8b show the brake device according to FIG. 1 with brake discs in series;

DESCRIPTION OF THE PREFERRED EMBODIMENT

Figure 1A:
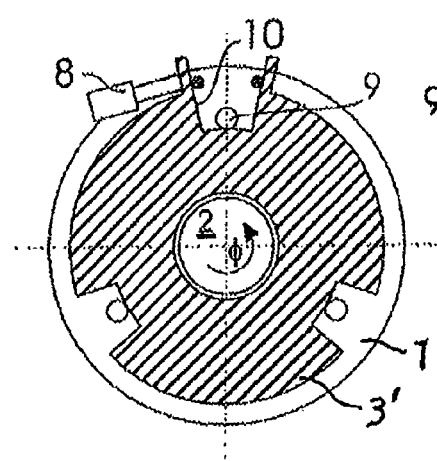
FIG. 1a shows a brake device according to a first embodiment of the present invention in released state, in a section I-I in FIG. 1b.

The same reference numerals are used in the figures for equivalent functions. Prime ('), double-prime ("), and triple-prime ("') symbols are used in the figures to identify specific examples of generic terms. In one set of examples, the generic term "movable element", identified by reference number 2, may include an operating/drive shaft 2', a brake rail 2", or a brake disc 2'" as shown in the drawings. In a further example, the generic germ "relative element", identified by reference number 3, may include a disc 3' as shown in the drawings. In another set of examples, the generic term "actuating element", identified by reference number 4, may include an armature disc 4' or an armature element 4" as shown in the drawings.

Figure 1B:
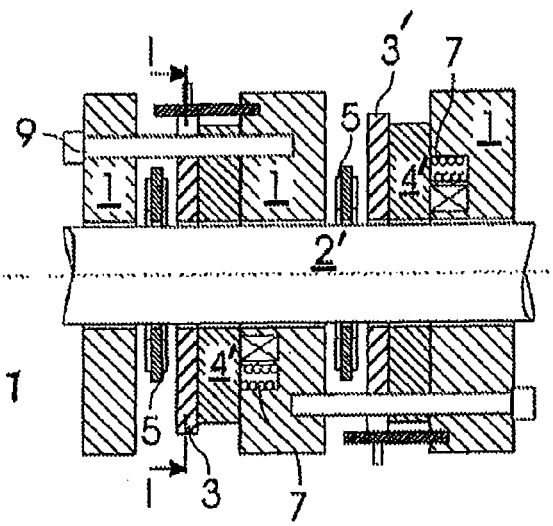
FIG. 1b shows the brake device according to FIG. 1a in a lateral section.

FIGS. 1a, 1b show a brake device such as is usable for an elevator drive, according to an embodiment of the present invention, in released, non-braking state in a side view and a front view, respectively. The brake device comprises a static element in the form of a multi-part housing 1 which is fixed in terms of inertia. A movable element in the form of an operating shaft 2' is rotatably mounted in the housing 1 and has the degree of rotational freedom φ relative to the housing 1. Two brake elements in the form of brake discs 5 are arranged on the shaft to be axially displaceable, but secure against relative rotation, for example by means of shaft splines or a key (not illustrated).

Two actuating elements in the form of armature discs 4' are mounted in the housing 1 to be axially displaceable, but secure against relative rotation. For this purpose distributed over the circumference are three pins 9 which engage in through bores or blind bores in the housing 1 and the armature discs 4' and on which the armature discs 4' slide.

A relative element in the form of a disc 3' is mounted between each brake disc 5 and armature disc 4' to be axially displaceable. The discs 3' each have three groove-like cutouts 10 with a groove base through which the pins 9 engage in such a manner that they rest on the respective groove base and thus rotatably mount the discs 3'. A rotation of the discs 3' is mechanically positively limited by the flanks of the grooves 10, wherein the discs can be rotated through a specific angle before the pins 9 bear against the respective flanks. The discs 3' are biased into their normal position A, which is shown in FIGS. 1a and 2a and which is detected by a sensor device 8, by two springs which are received in the housing 1 and internally supported at the flanks 10, which are prolonged relative thereto (at the top in FIG. 1a).

FIGS. 1a, 1b show the brake device in released state. For this purpose electromagnets draw the armature discs 4' against the pressure of a compression spring 7 away from the brake discs 5, which can thereby rotate freely together with the operating shaft 2'. In this state the relative elements 3 are kept by the above-mentioned springs in their normal position, which indicates fault-free operation.

Figure 2A:
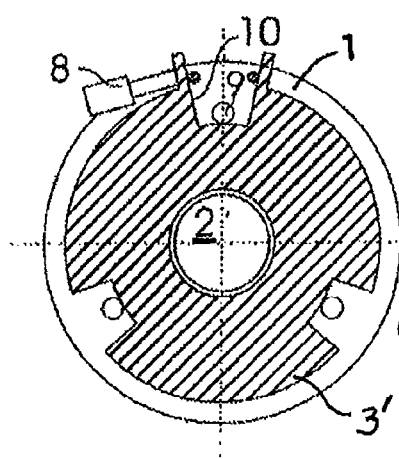
FIGS. 2a, 2b show the brake device according to FIG. 1 in a normal holding state.
Figure 2B:
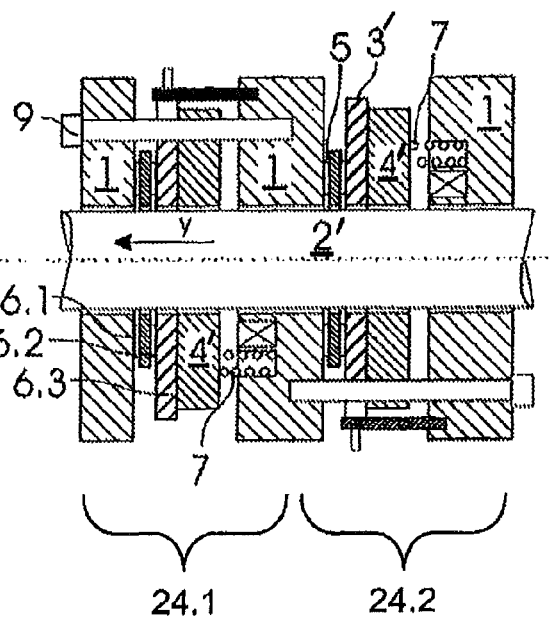

FIGS. 2a, 2b show the brake device in applied state. For this purpose the electromagnets are no longer supplied with energy, so that the armature discs 4' are acted by way of the spring 7 by a normal force FN in the direction of a second, axial degree of freedom y. The armature discs 4' press, by the same normal force, the relative elements 3 against the brake discs 5, which are thereby axially displaced and pressed by the same normal force against the housing 1.

Through this normal force FN a first frictional contact forms in a first contact surface 6.1 between housing 1 and brake disc 5, a second frictional contact forms in a second contact surface 6.2 between brake disc 5 and relative element 3 and a third frictional contact forms in a third contact surface 6.3 between relative element 3 and armature disc 4'. As a result, a sliding friction prevails at the outset in the first and second frictional contact due to the rotating operating shaft 2', so that a first or second friction force (or a friction torque) $FRi^G=\mu i^G \times FN$ (i=1, 2). In that case, $\mu i^G$ denotes the coefficient of sliding friction in the first or second frictional contact.

Static friction initially prevails in the third frictional contact, since relative element 3 and armature disc 4' are at rest relative to one another. The maximum effective third friction force FR3max is thus given by $FR3max^H=\mu 3^H \times FN$, wherein $\mu 3^H$ indicates the coefficient of static friction in the third frictional contact. This is selected so that the maximum third static friction force is greater than the second sliding friction force:

$$\mu 3^H > \mu 2^G \qquad (5)$$

$$\Rightarrow \mu 3^H \times FN > \mu 2^G \times FN \qquad (5')$$

$$\Rightarrow FR3max^H > FR2^G \qquad (5'')$$

The relative element 3 is held in its normal position A by the adhesive force margin $(FR3max^H - FR2^G)$, whilst the brake disc 5 slides thereat. When the operating shaft 2' finally stops (FIG. 2a), then the first and second frictional contact also change from sliding friction to static friction. Since the coefficients of static friction $\mu 1^H = \mu 2^H >> \mu 3^H$ are selected, the maximum second friction force FR2max is now greater than the maximum third friction force FR3max. In this connection it is to be noted that for the sake of simplicity there is mention in each instance only of a coefficient of friction $\mu i^H$, $\mu i^G$. In reality each of these coefficients of friction is subject to a margin of error or a tolerance. By way of example, the definition $\mu 3^H > \mu 2^G$ is thus to be understood in the sense that the value of $\mu 3^H$, regardless of its tolerance position, is greater than the value of $\mu 2^G$, regardless of the tolerance position thereof. The tolerance limits are therefore preferably selected so that the explained equations are also applicable to friction forces or coefficients of friction lying at the tolerance limits so as to be able to ensure functionality in accordance with the invention even in the case of scatters, which arise in practice, within the tolerances.

Figure 3A:
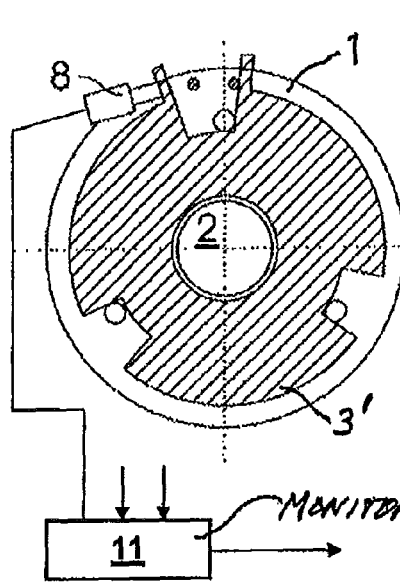
FIGS. 3a, 3b show the brake device according to FIG. 1 in a case of a faulty function, with monitoring logic system.
Figure 3B:
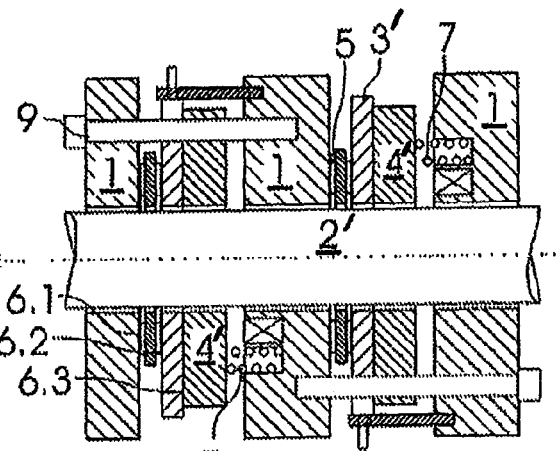

A possible faulty function of the brake device consists in that the brake device erroneously does not release when the operating shaft is placed back in operation. In this case the operating shaft 2' exerts by way of the brake disc 5, starting from the holding position described in the foregoing with respect to FIG. 2a, a force on the still-formed first, second and third frictional contacts. Since the maximum third friction force is at its smallest due to the selection of the coefficients of friction $\mu 1^H = \mu 2^H >> \mu 3^H$ the third frictional contact initially changes from static friction to sliding friction and the relative element 3 begins to rotate relative to the armature disc 4'. In that case the relative element rotates into the braking position B which is shown in FIGS. 3a, 3b and is detected by the sensor device 8. This thereupon delivers status information to a monitoring logic system 11. The monitoring logic system 11 evaluates the signal of the sensor device 8 with use of further signals such as, for example, movement or speed state of the travel body or of the movable element 2 and/or a braking signal which indicates whether the brake is applied or released, and issues a possible item of fault information to an elevator control (not illustrated), which stops the drive of the operating shaft 2' and thus prevents red-hot heating of the brake discs 5 and triggering of a corresponding service communication.

A further possible faulty function of the brake device consists in that the holding force applied by the brake device is insufficient. Again, starting from the holding position described with respect to FIG. 2a the braking force FRmax maximally applied in the normal position A by the brake device is in the case of the embodiment of two brake discs $$FRmax = 2 \times (\mu 1^H + \mu 3^H) \times FN \qquad (6)$$

As stated in the foregoing, on the basis of the degree of rotational freedom φ use can in that case also be made in the equations of torques instead of translational forces. If the friction forces are insufficient, the operating shaft 2' begins to rotate. Since the maximum third friction force is at its smallest due to the selection of the coefficients of friction $\mu 1^H = \mu 2^H >> \mu 3^H$ the third frictional contact then changes from static friction to sliding friction, whilst static friction continues to be present in the second frictional contact. The relative element 3 begins to rotate relative to the armature disc 4'. In that case the relative element again rotates into the braking position B, which is shown in FIGS. 3a, 3b and detected by the sensor device 8. This thereupon issues a faulty-function report as described in the foregoing, for example by way of a monitoring logic system, to an elevator control (not illustrated).

In the braking position B (FIG. 3a) the mechanically positive couple between pin 9 and the flanks of the cut-out 10 prevent further rotation of the relative element 3, this thereby being fixed in the first degree of freedom y relative to the housing 1. The relative element 3 thus now transmits the greater second static friction force to the brake disc 5 and the entire braking force consequently increases to $$FR + 2 \times (\mu 1^H + \mu 2^H) \times FN \qquad (6')$$

Since the brake device is designed so that in the normal case the friction force, which is available in the first and third frictional contacts, according to Equation (6) is sufficient for holding the operating shaft 2', a safety margin of $(\mu 1^H + \mu 2^H)/(\mu 1^H + \mu 3^H)$ is thus given.

Figure 4:
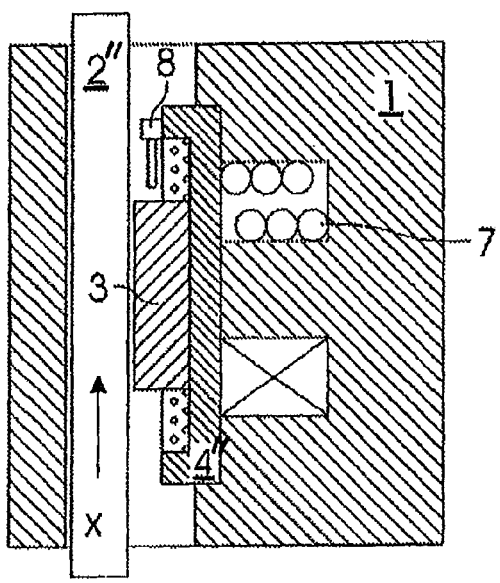
FIG. 4 shows a brake device according to a second embodiment of the present invention in opened state, in a lateral section.
Figure 11:
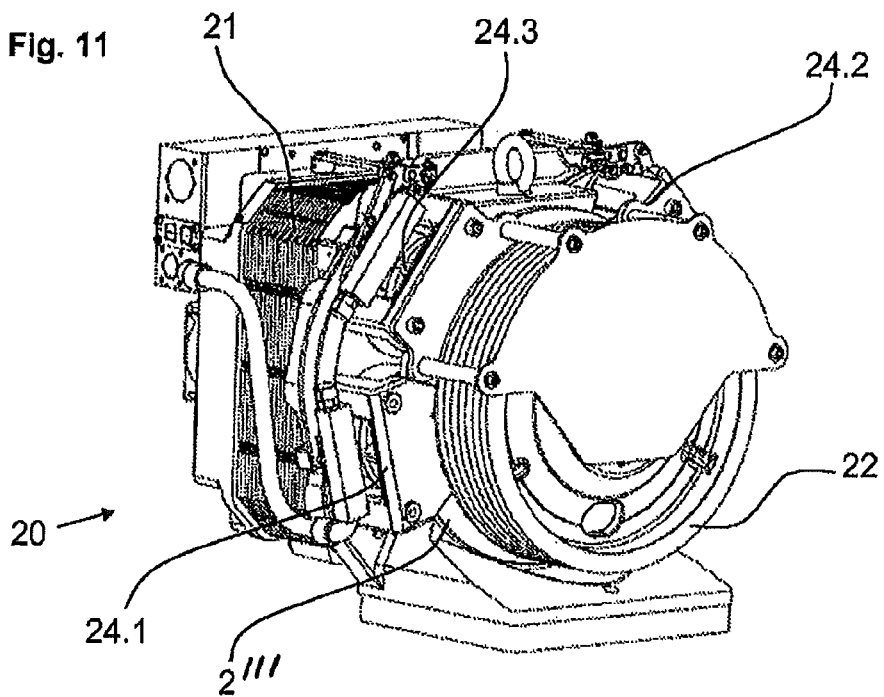
FIG. 11 shows an alternative embodiment of an elevator drive.
Figure 12:
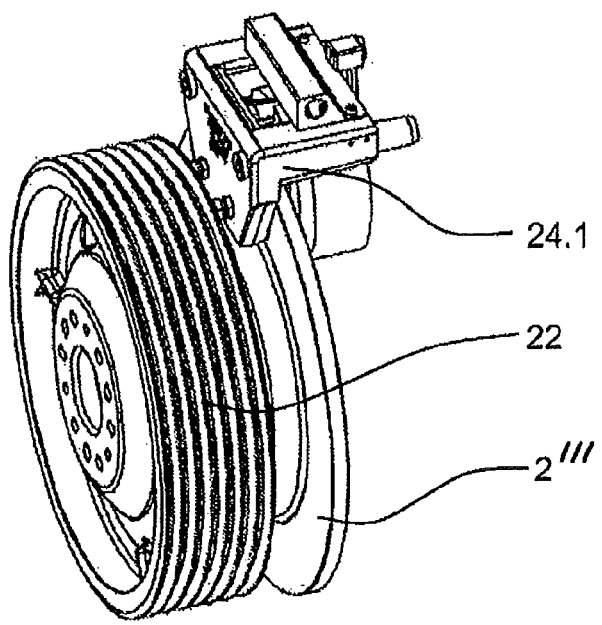
FIG. 12 shows a detail of brake arrangement in a drive according to FIG. 11.

FIG. 4 shows a brake device according to a second embodiment in released state in a lateral section. This brake device is provided for an elevator installation in which the brake device 24.1, 24.2 is installed at a brake disc of an elevator drive, as illustrated in FIGS. 11 and 12, or in which the housing 1—which can be fastened to an elevator car 16 similarly to the illustration in FIG. 13—moves in a first degree of freedom x along a brake rail 2", 15.

When the brake device is released (FIG. 4) an electromagnet draws an armature element 4", against the bias of a compression spring 7, in a second degree of freedom y into the housing 1 so that the housing 1 can slide free of friction along the brake rail.

Figure 5:
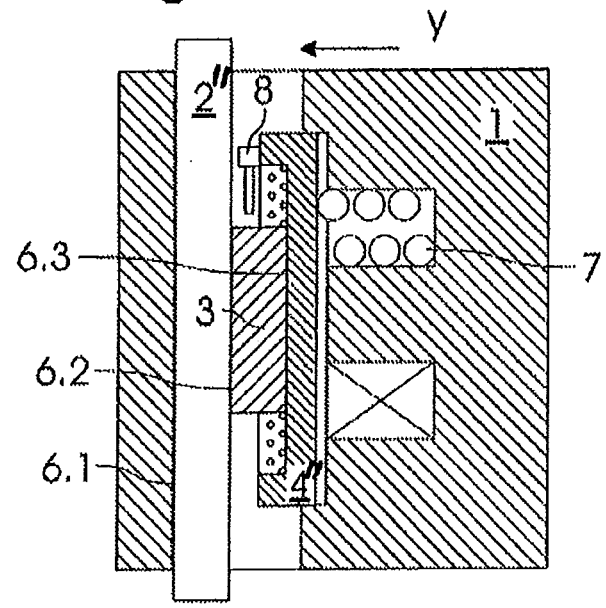
FIG. 5 shows the brake device according to FIG. 4 in a normal holding state.

For braking the elevator car 16, the electromagnet (or another suitable release drive) is switched off (FIG. 5) and the compression spring 7 presses the armature element 4" in the second degree of freedom y by a normal force FN against a relative element 3, which is arranged in the armature element 4" to be displaceable along the first degree of freedom x and is held by compression springs on either side in a normal position A (FIGS. 4, 5). The relative element 3 is thereby also pressed by the normal force FN against the brake rail 2", 15, which in turn is pressed against the housing 1. In that case a first frictional contact is formed in a first contact surface 6.1, in which the brake rail 2" is pressed against the housing 1, a second frictional contact is formed in a second contact surface 6.2, in which the relative element 3 contacts the brake rail 2", and a third frictional contact is formed in a third contact surface 6.3, in which armature element 4" and relative element 3 are in contact with one another. In that case, sliding friction is present in the first and second frictional contact due to the brake rail 2 moving relative to the housing 1 and static friction is present in the third frictional contact between the relative and armature elements 3, 4" stationary relative to one another.

The coefficients of static friction $\mu 1^H = \mu 2^H >> \mu 3^H$ are selected as in the first exemplifying embodiment. Equally, the coefficients of sliding friction $\mu 1^G = \mu 2^G$ in the first and second contact surfaces are smaller than the coefficient of static friction $\mu 3^H$ in the third contact surface. Since all contact surfaces are acted on by the same normal force FN, the sliding friction force in the first and second frictional contacts is lower than the maximum static frictional force in the third frictional contact:

$$\mu 1^G = \mu 2^G < \mu 3^H < \mu 1^H = \mu 2^H \quad (7)$$

$$\Rightarrow FR1^G = FR2^G < FR3\max{}^H \quad (7')$$

The brake rail 2", 15 therefore slides in the first and second frictional contact, while the relative element 3 remains in its normal position A biased by the compression springs (FIG. 5). At standstill, the first and second frictional contacts then also change from sliding friction to static friction and the total friction force by which the housing 1 holds the brake rail 2" is limited by the static friction in the first and second frictional contacts:

$$FR\max = (\mu 1^H + \mu 3^H) \times FN \quad (6'')$$

As in the first exemplifying embodiment, a blocking brake device, which is not released notwithstanding movement of the housing 1 relative to the brake disc 2", has the consequence—just like a too-small total friction force FRmax according to Equation (6")—of entraining of the relative element 3 by the brake rail 2" in the first degree of freedom x until this is stopped at an upper abutment in the armature element 4" (not illustrated). In that case a sensor 8 registers the transition of the relative element from the normal position A (FIG. 5) to this braking position B (FIG. 6) and issues a faulty-function report. As soon as the relative element is fixed by the abutment (not illustrated) in the first degree of freedom x relative to the armature element 4" the second friction force FR2 in the second contact surface 6.2 opposes the movement and the total friction force increases from $FR = (\mu 1 + \mu 3) \times FN$ to $FR = (\mu 1 + \mu 2) \times FN$.

In the first and second exemplifying embodiments the maximum second and third friction forces were respectively realized by appropriate selection of the coefficients of friction $\mu 2, \mu 3$, particularly the coefficients of static friction $\mu 2^H, \mu 3^H$. Alternatively or additionally, the different maximum friction forces can, however, also be realized in that the third contact surface 6.3 is inclined relative to the normal force. For this purpose FIG. 7 shows, in a schematic diagram, the forces acting on a relative element 3 in the case of loading by the common normal force FN. The principle shown in FIG. 7 can be realized in, for example, the first or second exemplifying embodiment, wherein then the same reference numerals correspond with the same elements, the actuating element 4 in FIG. 7 thus corresponding with, for example, the armature disc in the first exemplifying embodiment or the armature element 4" in the second exemplifying embodiment.

It may be assumed at the outset that the held movable element 2 seeks to move under the influence of external forces, for example the load of an elevator car, in the first degree of freedom x in positive direction (upwardly in FIG. 7). On loading of the actuating element 4 by the normal force FN a friction force FR2, which is of the same size as, but opposite to, the sum of the remaining forces acting on the movable element 2, but can be at most $FR2\max = \mu 2^H \times FN$, then arises in the second contact surface 6.2.

The normal force FN acting in the third contact surface 6.3, which is inclined by the angle $(\pi - \alpha)$ against the normal force FN, divides into two components, wherein one component $FN \times \sin(\alpha)$ is perpendicular to the third contact surface 6.3 and the other component $FN \times \cos(\alpha)$ is oriented tangentially to the third contact surface 6.3. The third friction force maximally acting in the third contact surface 6.3 thus results from the one component to form $FR3\max = \mu 3^H \times \sin(\alpha) \times FN$. Through suitable selection of the angle $\alpha$ of inclination it is thus possible, for example, to preset a lower maximum third friction force for the same coefficient of static friction. If this friction force is still projected in the third degree of freedom x, then a movement of the relative element 3 relative to the actuating element 4 in the first degree of freedom only still opposes at most a static friction force of $FR3\max = \mu 3^H \times \sin^2(\alpha) \times FN$.

As can be additionally seen from FIG. 7, a movement of the relative element 3 relative to the actuating element in the first degree of freedom x in positive direction (upwardly in FIG. 7) additionally opposes a component $FN \times \cos(\alpha)$, which to that extent increases the total effect of maximum third friction force. In a case of movement in negative direction (downwardly in FIG. 7) this component $FN \times \cos(\alpha)$ thereagainst reduces the effective maximum third friction force, so that different maximum third friction forces arise in the two directions of movement. This can be advantageously utilized if, for example, the elevator car, which is held by the brake device, is only part-balanced, i.e. the movable element 2 has to be held more strongly in one direction of movement than in the other.

Figure 6:
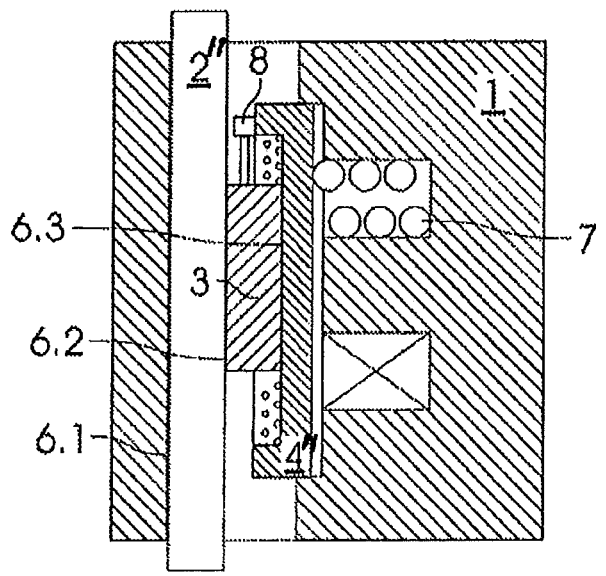
FIG. 6 shows the brake device according to FIG. 4 in the case of a faulty function.

Moreover, on displacement of the relative element 3 relative to the actuating element 4 a change in adjustment travel along the degree of freedom y necessarily results. This change produces an increase or decrease in the normal force FN in correspondence with a force characteristic of adjusting actuators such as, for example, the compression spring 7 (FIGS. 4 to 6). A braking force can thus be influenced in correspondence with a movement direction or braking direction.

The exemplifying embodiments refer to matching the coefficients of sliding and static friction of the friction surfaces in order to be able to reliably detect a faulty function not only in the case of single holding, but also in the case of braking and subsequent holding. This is achieved in that the condition $$\mu2^G < \mu3^H < \mu2^H \qquad (7)$$

is fulfilled. This is not obligatory, since in many current cases of use a brake device is used in the normal case only for holding, for example an elevator car at standstill. Use of the brake device for braking is required merely in a fault case and thus even itself represents a fault situation. It is not required in these individual cases for the relative element 3 to remain in its normal position. It may quite well be displaced from its normal position into the braking position, whereby then the correspondingly higher braking force $$FR = FR1 + FR2 \qquad (1')$$

comes into play. This can be achieved in that the coefficients of friction $\mu3^H$, $\mu3^G$ of the third contact surface are selected to the significantly smaller than the coefficients of friction $\mu2^H$, $\mu2^G$ of the second contact surface:

$$\mu3^G < \mu3^H << \mu2^G < \mu2^H \qquad (7')$$

Combinations of the illustrated forms of embodiment are obviously possible. Thus, for example, several second and third contact surfaces can be combined to form a first contact surface, whereby the safety margin is additionally increased.

Figure 9:
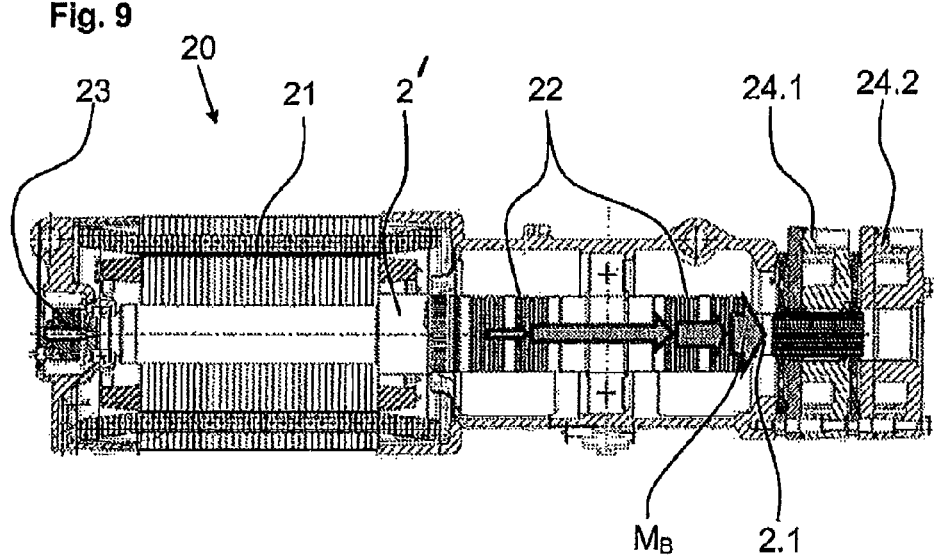
FIG. 9 shows an elevator drive with attached brake device.
Figure 10:
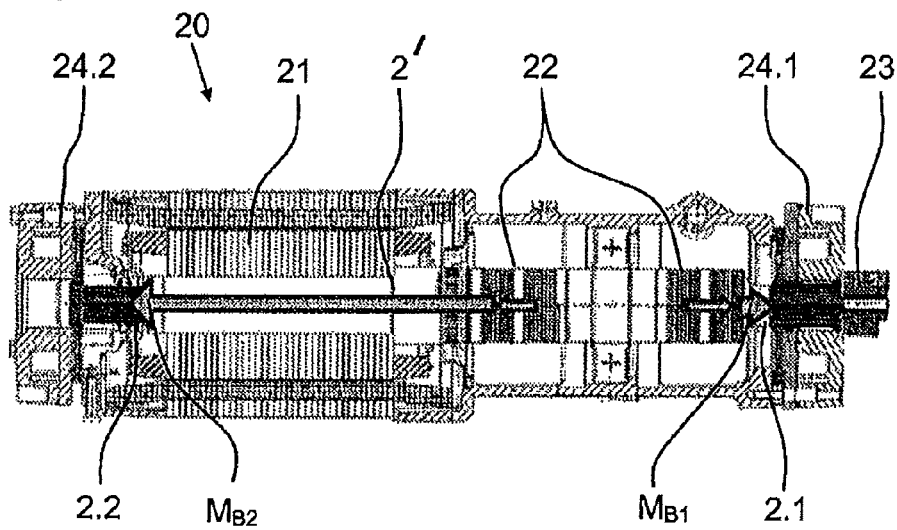
FIG. 10 shows an elevator drive with brake device attached on either side of a traction wheel.

In a preferred variant of embodiment the brake device 24.1, 24.2 is, as illustrated in FIGS. 9 and 10, installed in or attached to a drive 20 of an elevator installation 18 (as is explained in the following with reference to FIG. 13). The drive 20 comprises one or more drive pulleys or traction wheels 22 which are integrated in or mounted on a drive shaft 2'. The drive shaft 2' is driven by a motor 21 and held at standstill or, in the case of need, braked by the brake device 24.1, 24.2. On occasion a translation means can be arranged between motor 21 and drive shaft 2'. The drive 20 thus also includes the brake device 24.1, 24.2 which as a rule is divided into two substantially identical units. Each of the units is, in its braking position (B), by itself capable of stopping and fixing the moved travel body. According to a first form of embodiment of the drive (FIG. 9) the two units are combined to form a single brake device and arranged at an end of the drive shaft. In this form of embodiment the drive shaft corresponds with the movable element 2. This form of arrangement is economic, since the brake device can, for example, be pre-mounted as a complete unit.

In accordance with one form of embodiment of the drive 20 according to the invention (FIG. 10) the two units of the brake device 24.1, 24.2 are attached to the two ends of the drive shaft 2'. This means that the drive pulley 22 is arranged between the units of the brake device 24.1, 24.2. Thus, during braking a braking or holding moment is distributed from the drive pulley 22 to the two units. Significantly better distributions of force in the drive shaft 2' thereby result and a risk of failure of the brake device due to fracture of the drive shaft 2' is reduced. As shown in FIG. 9, the braking or holding moment $M_B$ is concentrated at a single point 2.1 while as shown in FIG. 10, the braking or holding moment is divided into $M_{B1}$ at the point 2.1 and $M_{B2}$ at a second point 2.2. A shaft encoder 23 is mounted at an opposite end of the shaft from the brake devices 24.1, 24.2 in FIG. 9 and the encoder 23 is positioned at the end of the shaft 2' adjacent the brake device 24.1 in FIG. 10.

In the ideal case the braking action between normal position and braking position is doubled. This is the case when the coefficient of friction μ3 in the third contact surface is approximately zero. Through use of a brake arrangement with several brake devices 24.1, 24.2 connected one behind the other such as illustrated in, for example, FIGS. 8a and 8b it is possible to influence the braking force amplification between normal position and braking position. If, for example, several brake discs 5 and relative elements 3 or static elements 1 are arranged one behind the other a desired braking amplification can be achieved by the design of the free-running travel of the individual relative or static elements. In the example according to FIGS. 8a and 8b three second contact surfaces 6.2, which come into action only in the braking position, are arranged to form a first contact surface 6.1. Thus, disregarding the friction force of the third contact surface 6.3, a multiplication of the braking force arises on attainment of the braking position. An expert can determine desired combinations.

FIG. 11 and FIG. 12 show an alternative arrangement of an elevator drive 20 with brake devices. In this connection, several brake devices 24.1, 24.2, 24.3, etc., such as described in FIGS. 4 to 6 are arranged to be distributed over a circumference of a brake disc 2''', which forms a unit with the drive shaft.

Figure 13:
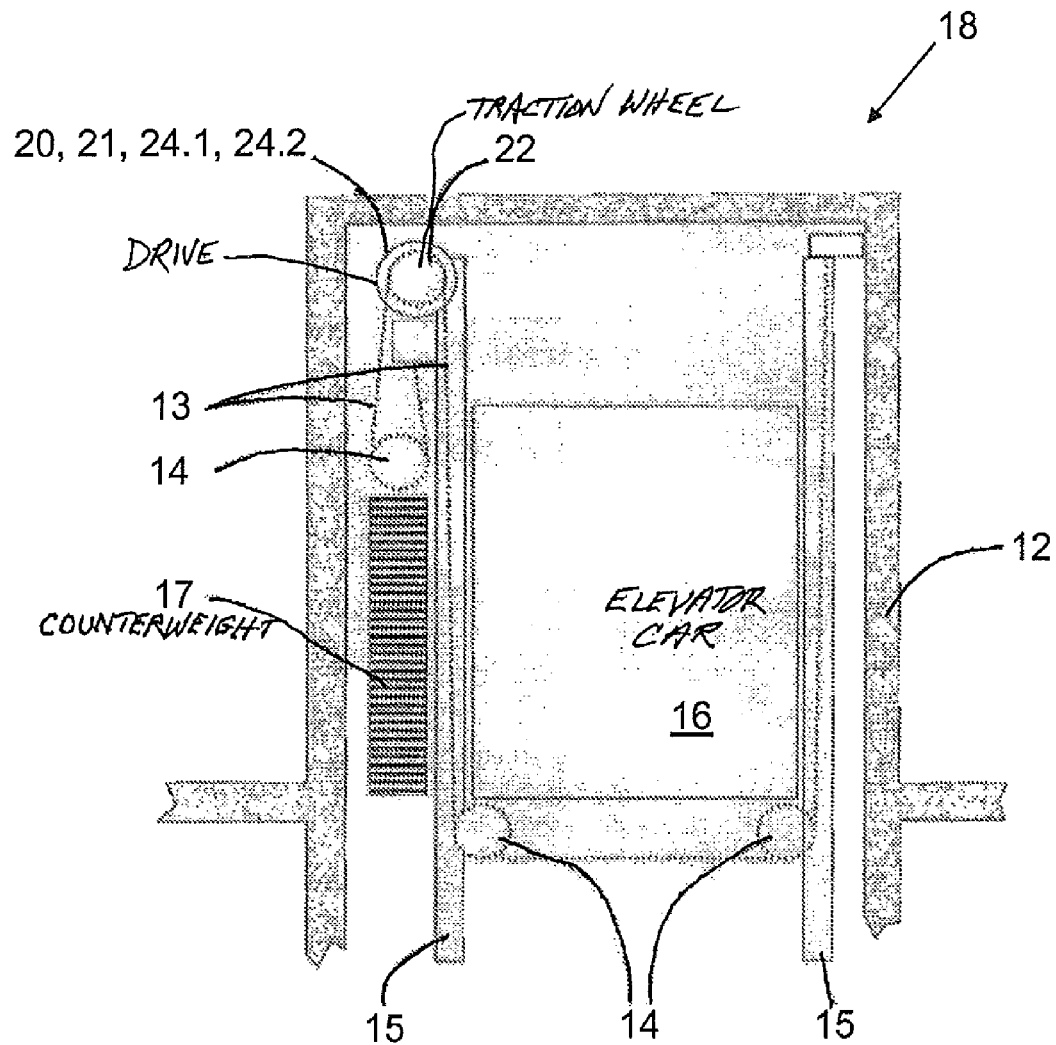
FIG. 13 shows an example of an elevator installation.

FIG. 13 shows an elevator installation 18 with elevator drive 20 arranged in the upper region of a travel shaft 12. The elevator drive 20 drives the elevator car 16 by means of the traction wheel 22 via supporting and driving means 13. The supporting and driving means 13 connects the elevator car 16 with a counterweight 17, so that in correspondence with a drive direction of the elevator drive the car 16 moves upwards and the counterweight 17 downwards or, with changed rotational direction of the elevator drive, vice versa. If the elevator drive 20 is held by its brake devices 24.1, 24.2, car and counterweight 17 are also at a stop or at standstill. In the illustrated example, car 16 and counterweight 17 are connected with the supporting and driving means 13 by way of deflecting rollers 14. The forces acting on the drive 20 are thus halved.

Alternatively, the drive 20 can also be arranged in place of one of the deflecting rollers 14.

The two units of the brake device are attached to the two ends of the drive shaft 2'. This means that the drive pulley 22 is arranged between the units of the brake device 24.1, 24.2. During braking a braking or holding moment is thus distributed from the drive pulley 22 to the two units. Significantly better force distributions in the drive shaft 2' thus result and a risk of failure of the brake device due to a fracture of the drive shaft 2' is reduced.

If the individual units or devices of the brake arrangement, preferably units such as illustrated and explained in the variants of embodiment of FIG. 4 to FIG. 7, are arranged directly at the elevator car it is advantageous to apportion the brake units to the two sides of the elevator car. The resulting braking and holding forces can thus be introduced halved into the corresponding brake rails or guide rails. If in corresponding manner the brake arrangement is divided up into, for example, four brake devices, advantageously two of the brake devices are arranged below the elevator car and the remaining two brake devices in the upper region of the elevator car. As a result, not only is the introduction of force into the brake rails or guide rails optimized, but the introduction of force into the elevator car itself is also optimized.

The expert will recognise further advantageous arrangements. Thus, for example, the expert can distribute the brake units to elevator car and counterweight, or to car and counterweight and deflecting rollers or drive pulleys. This enables a distribution of the braking and holding forces to different components or load zones. The functional reliability is thereby increased, since individual components are loaded only by part forces.

Figure 14:
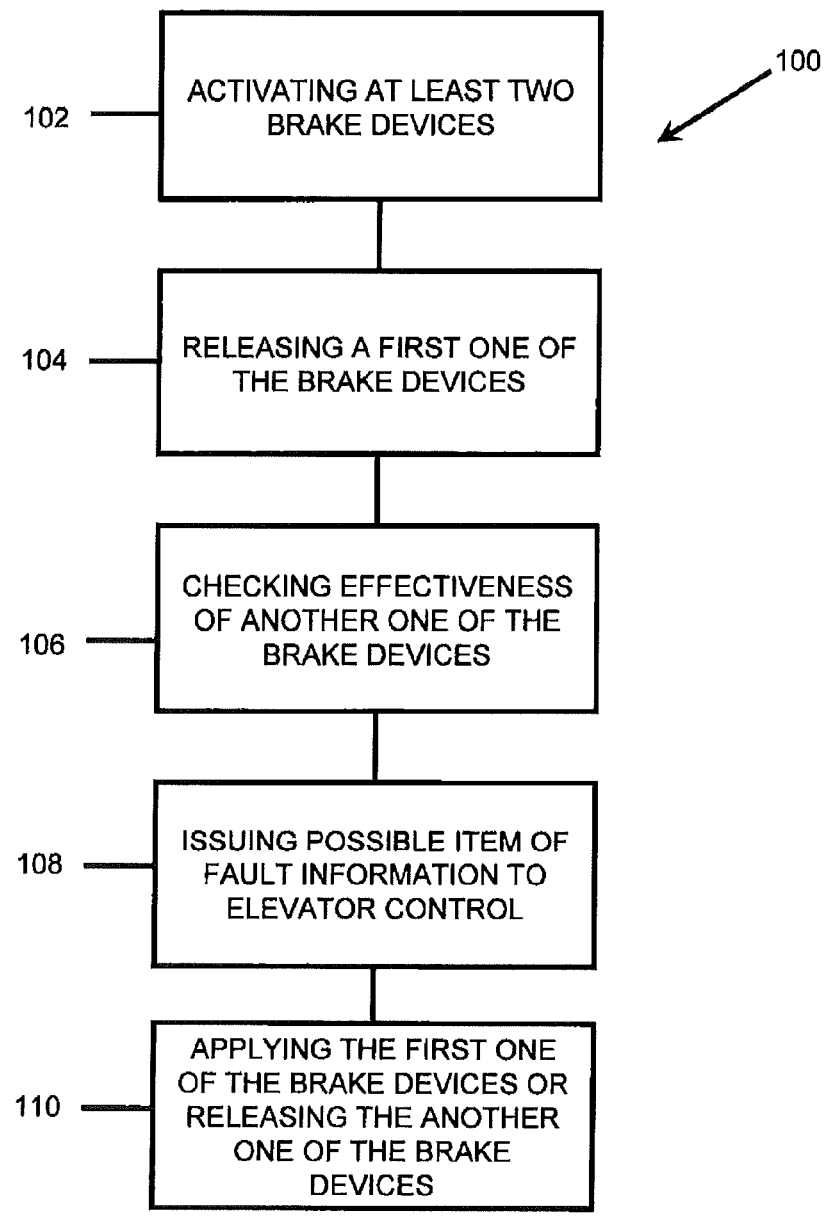
FIG. 14 shows a flow diagram of a method according to one embodiment of the disclosure.

As illustrated in FIG. 14, and described further hereinabove, the present disclosure further includes a method 100 of driving and holding the elevator car with the elevator drive 20. The method includes a first step 102 of activating the at least two brake devices 24.1, 24.2 to hold the traction wheel 22. In a second step 104, a first one of the at least two brake devices 24.1, 24.2 is then released. An effectiveness of another one of the at least two brake devices 24.1, 24.2 in braking or holding engagement with the traction wheel 22 is then checked in a third step 106. In a fifth step 108 a possible item of fault information is issued to the elevator control on the basis of the checked effectiveness. On the basis of this fault information, in a sixth step 110, either the first one of the at least two brake devices 24.1, 24.2 is applied or the another one of the at least two brake devices 24.1, 24.2 is released.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator drive for driving and holding an elevator car, comprising:
 a traction wheel for providing a driving force and a holding force for the elevator car;
 a motor for driving said traction wheel;
 a brake arrangement for holding said traction wheel;
 a drive shaft connecting said traction wheel, said motor and said brake arrangement together, wherein the said arrangement further comprises at least two brake devices, wherein said traction wheel is arranged between said at least two brake devices and wherein said at least two brake devices are arranged on opposite sides of said traction wheel on said drive shaft; and
 a monitoring logic system for ascertaining whether one of said at least two brake devices alone can maintain the elevator car at standstill, wherein when said at least two brake devices are activated to hold said traction wheel and one of said at least two brake devices is briefly released, said monitoring logic system ascertains during a time in which the one of said at least two brake devices is released whether another one of said at least two brake devices alone can maintain the elevator car at standstill, wherein the monitoring logic system issues a possible item of fault information to an elevator control on the basis thereof, the elevator control either applying the first one of the at least two brake devices or releasing the another one of the at least two brake devices.

2. The elevator drive according to claim 1 wherein said at least two brake devices are individually activated and including a monitoring logic system for ascertaining whether one of said at least two brake devices alone can maintain the elevator car at standstill.

3. The elevator drive according to claim 1 including when activation of said at least two brake devices is with a delay in time or during a stop of the elevator car one of said at least two brake devices is briefly released, said monitoring logic system ascertains during a time in which one of said at least two brake devices is applied whether one of said at least two brake devices alone can maintain the elevator car at standstill.

4. The elevator drive according to claim 1 wherein said at least two brake devices are provided with:
 a static element;
 a movable element movable relative to said static element in a first degree of freedom in correspondence with a direction of travel of the elevator car, wherein a first frictional contact in a first contact surface is formed between said static element and said movable element by a normal force acting in a second degree of freedom, wherein in the first frictional contact a first friction force opposes movement of said movable element relative to said static element; and
 a relative element adjustable in the second degree of freedom in a direction of said movable element, wherein a second frictional contact in a second contact surface is formed between said movable element and said relative element by the normal force, wherein in the second frictional contact a second friction force opposes movement of said movable element relative to said relative element, and wherein said relative element is movable in the first degree of freedom relative to said static element between a normal position and a braking position, wherein said relative element is biased into the normal position.

5. The elevator drive according to claim 4 wherein a movement of said relative element beyond the braking position is blocked by said static element.

6. The elevator drive according to claim 4 wherein said at least two brake devices include an actuating element fixed in the first degree of freedom relative to said static element and which is adjustable in the second degree of freedom in a direction of said movable element, wherein a third frictional contact in a third contact surface in which a third friction force opposes movement of said relative element relative to said actuating element is formed between said actuating element and said relative element, in an adjusted state, by the normal force, and wherein the second and third contact surfaces are formed whereby a maximum second friction force of the second contact surface is greater than a maximum third friction force of the third contact surface.

7. The elevator drive according to claim 4 wherein said at least two brake devices include a sensor device for detecting at least one of the normal position and the braking position of said relative element.

8. The elevator drive according to claim 7 wherein said monitoring logic system evaluates signals generated by said sensor device, a control signal of said at least two brake devices and a movement state of said movable element and determines a function of said at least two brake devices.

9. The elevator drive according to claim 8 wherein said monitoring logic system determines a fault function when: said control signal of said at least two brake devices indicates an applied state, the movement state of said movable element indicates "0" and said relative element is disposed in the braking position; or said control signal of said at least two brake devices indicates a released state, the movement state of said movable element indicates "≠0" and said relative element is disposed in the braking position.

10. The elevator drive according to claim 8 wherein said monitoring logic system determines a normal function when: said control signal of said at least two brake devices indicates an "applied" state, the movement state of said movable element indicates "0" and said relative element is disposed in the normal position; or said control signal of said at least two brake devices indicates an "applied" state, the movement state of said movable element indicates "≠0" and said relative element is disposed in the braking position; or said control signal of said at least two brake devices indicates a "released"

state, the movement state of said movable element indicates "≠0" and said relative element is disposed in the normal position.

11. The elevator drive according to claim 6 wherein the second contact surface of said at least two brake devices has a higher coefficient of static friction than the third contact surface.

12. The elevator drive according to claim 6 wherein the third contact surface of said at least two brake device has an inclination relative to a direction of application of the normal force.

13. The elevator drive according to claim 6 wherein at least one of said relative element and said actuating element is moved by the normal force in the second degree of freedom whereby the first, second and third frictional contacts are formed.

14. The elevator drive according to claim 6 wherein said at least two brake devices include a brake element fixed in the first degree of freedom relative to said movable element and is moved by the normal force in the second degree of freedom whereby the first, second and third frictional contacts are formed.

15. The elevator drive according to claim 6 wherein said movable element and said static element are moved relative to one another by the normal force in the second degree of freedom whereby the first, second and third frictional contacts are formed.

16. The elevator drive according to claim 6 wherein said actuating element is biased by resilient means applying the normal force and is selectably released by at least one of electromagnetic and hydraulic means.

17. The elevator drive according to claim 6 wherein said at least two brake devices include a plurality of said relative element and a plurality of said actuating element respectively associated therewith, wherein the second frictional contact in the second contact surface is formed between each said relative element and said movable element by the normal forth (FN) and the third frictional contact in the third contact surface is formed between each said relative element and said associated actuating element by the normal force.

18. A method of driving and holding an elevator car with an elevator drive comprising the steps of:
   a. providing a traction wheel for applying a driving or holding force for the elevator car;
   b. providing a motor for driving the traction wheel;
   c. providing a brake arrangement for braking or holding the traction wheel;
   d. providing a drive shaft connecting the traction wheel, the motor and the brake arrangement together, wherein the brake arrangement includes at least two brake devices arranged on opposite sides of the traction wheel on said drive shaft;
   e. activating the at least two devices to hold the traction wheel and then releasing a first one of the at least two brake devices;
   f. checking an effectiveness of another one of the at least two brake devices in braking or holding engagement with the traction wheel; and
   g. upon issuing a possible item of fault information to an elevator control on the basis of the checked effectiveness, either applying the first one of the at least two brake devices or releasing the another one of the at least two brake devices.

19. An elevator installation having an elevator drive comprising:
   an elevator drive arranged in a stationary position in an elevator shaft with a traction wheel for raising, lowering and holding an elevator car with a supporting and driving means connecting said elevator drive with said elevator car; or
   said elevator drive arranged at said elevator car for transmitting a traction force to the elevator shaft with said traction wheel and the elevator car is raised, lowered and held by the traction force;
   a motor for driving said traction wheel;
   a brake arrangement for holding said traction wheel;
   a drive shaft connecting said traction wheel, said motor and said brake arrangement together, wherein the said arrangement further comprises at least two brake devices, wherein said traction wheel is arranged between said at least two brake devices and wherein said at least two brake devices are arranged on opposite sides of said traction wheel on said drive shaft; and
   a monitoring logic system for ascertaining whether one of said at least two brake devices alone can maintain the elevator car at standstill, wherein when said at least two brake devices are activated to hold said traction wheel and one of said at least two brake devices is briefly released, said monitoring logic system ascertains during a time in which the one of said at least two brake devices is released whether another one of said at least two brake devices alone can maintain .the elevator car at standstill, wherein the monitoring logic system issues a possible item of fault information to an elevator control on the basis thereof, the elevator control either applying the first one of the at least two brake devices or releasing the another one of the at least two brake devices.

20. The elevator installation according to claim 19 including one of a static element and a movable element of said at least two brake devices is fixed and another of said static element and said movable element is coupled with the elevator car hold and brake the elevator car.

21. The elevator installation according to claim 20 wherein a normal force applied to said at least two brake devices generates an adhesion force in a normal position of said at least two brake devices sufficient to hold the elevator car together with a permissible load.

22. The elevator installation according to claim 20 wherein a normal force applied to said at least two brake devices generates a sliding force in a braking position of said at least two brake devices is sufficient to securely brake the elevator car together with a permissible load.

23. The elevator installation according to claim 21 wherein the normal force generates a sliding force in a braking position of said at least two brake devices is sufficient to securely brake the elevator car together with a permissible load and the sliding force is at least 50% greater than the adhesion force.

* * * * *